United States Patent

Courgeon et al.

[11] Patent Number: 5,785,448
[45] Date of Patent: Jul. 28, 1998

[54] DEVICE FOR COUPLING TWO SHAFTS

[75] Inventors: Jean-Claude Courgeon, Vendome; Jacky Auriau, Meslay; Amar Bouguerra, Blois, all of France

[73] Assignee: Lemforder Nacam, Vendome, France

[21] Appl. No.: 848,653

[22] Filed: Apr. 29, 1997

[30] Foreign Application Priority Data

May 2, 1996 [FR] France .................. 96 05605

[51] Int. Cl.[6] .................................................. F16B 2/00
[52] U.S. Cl. ........................... 403/325; 403/315; 403/321; 464/134
[58] Field of Search ................... 403/350, 325, 403/322, 321, 310, 316, 348, 359, 57, 74, 107; 464/160, 161, 134, 182; 74/492; 280/775

[56] References Cited

U.S. PATENT DOCUMENTS

| 4,523,871 | 6/1985 | Recker | 403/359 X |
|---|---|---|---|
| 4,859,110 | 8/1989 | Dommel | 403/325 |
| 4,957,387 | 9/1990 | Nasu | 403/325 X |
| 5,106,224 | 4/1992 | Van Gelderen | 403/325 X |
| 5,141,355 | 8/1992 | Stillwagon | 403/359 X |
| 5,149,223 | 9/1992 | Watts | 464/160 X |
| 5,398,946 | 3/1995 | Quiring | 403/325 X |
| 5,522,669 | 6/1996 | Recker | 403/325 X |
| 5,577,859 | 11/1996 | Nau | 464/182 X |
| 5,582,489 | 12/1996 | Marzio et al. | 403/354 |
| 5,632,568 | 5/1997 | Fechter | 403/359 X |
| 5,674,024 | 10/1997 | Castellon | 464/182 X |

Primary Examiner—Harry C. Kim
Attorney, Agent, or Firm—Laubscher & Laubscher

[57] ABSTRACT

A device for coupling two shafts adapted to turn about a common axis includes a rotational coupling system associated with an axial retaining system. The rotational coupling system includes conjugate profiles at the ends of the shafts. The axial retaining system comprises a two-part sleeve coupled axially to the shaft and cooperating with a spring disposed inside the sleeve. The end of each shaft is surrounded by the sleeve. The spring operates after releasing an arming system including studs on the sleeve cooperating with cams at the end of one of the shafts.

23 Claims, 6 Drawing Sheets

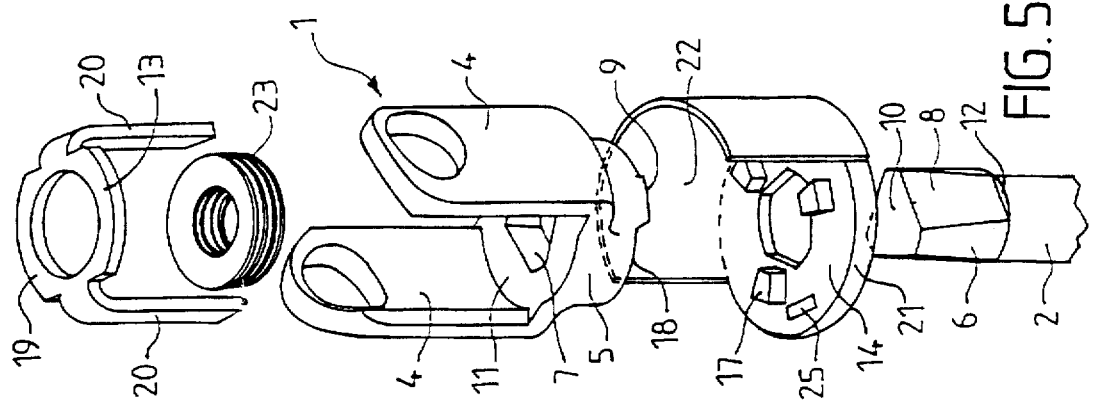
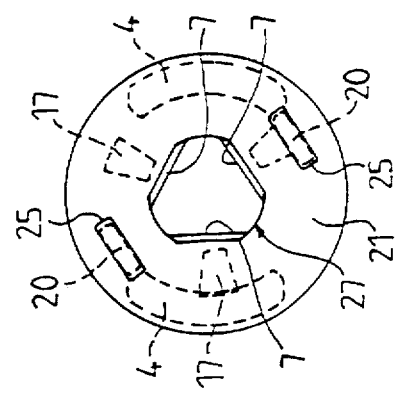
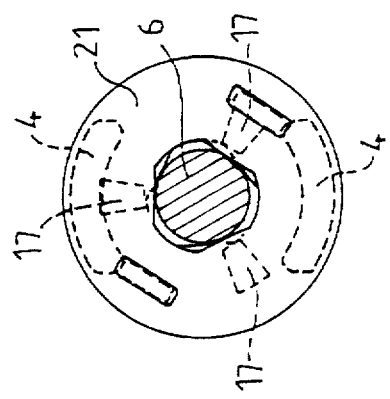
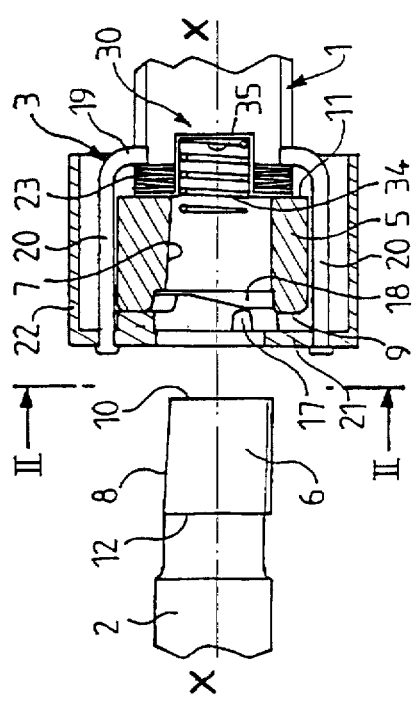
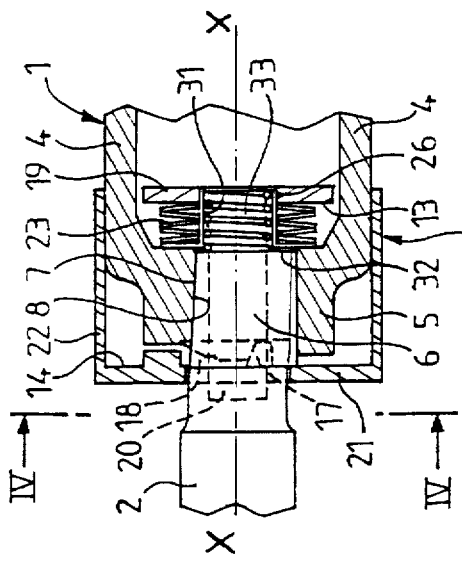

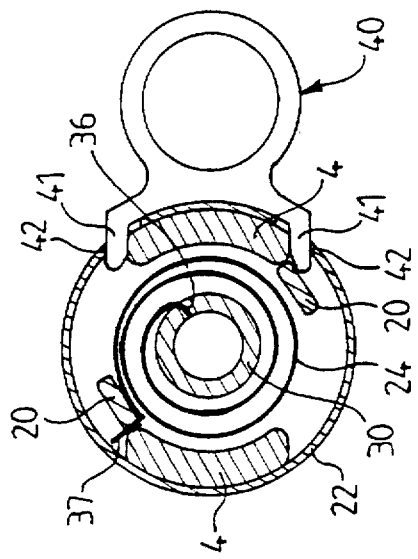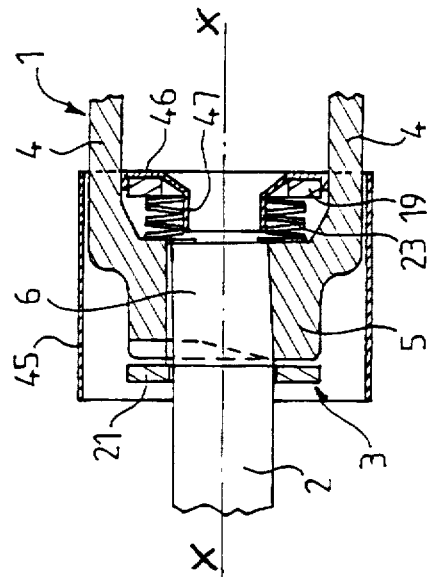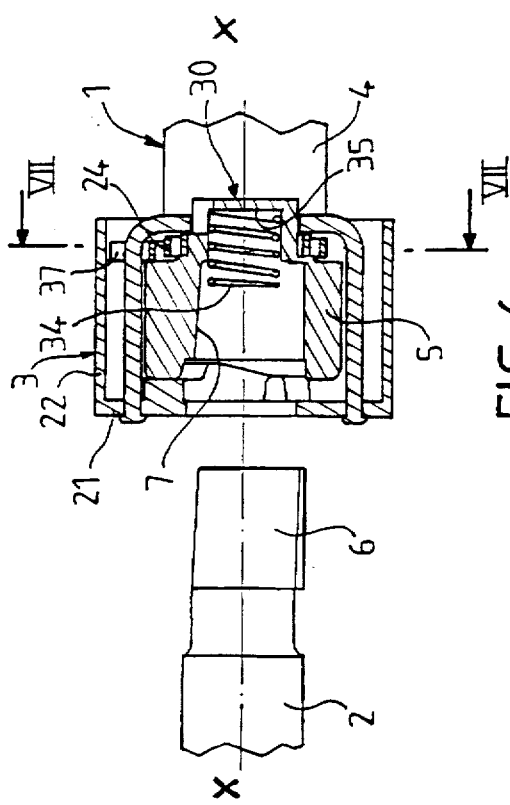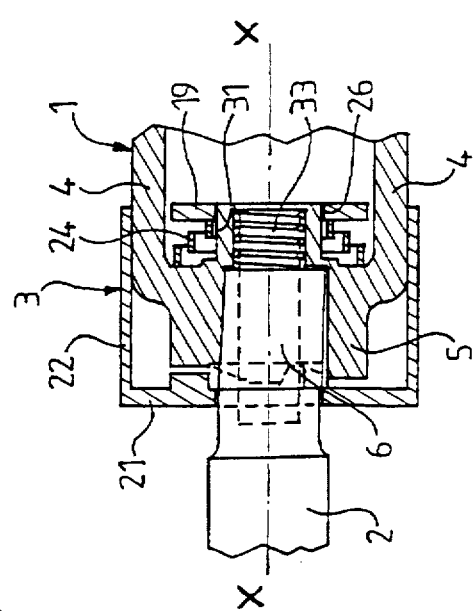

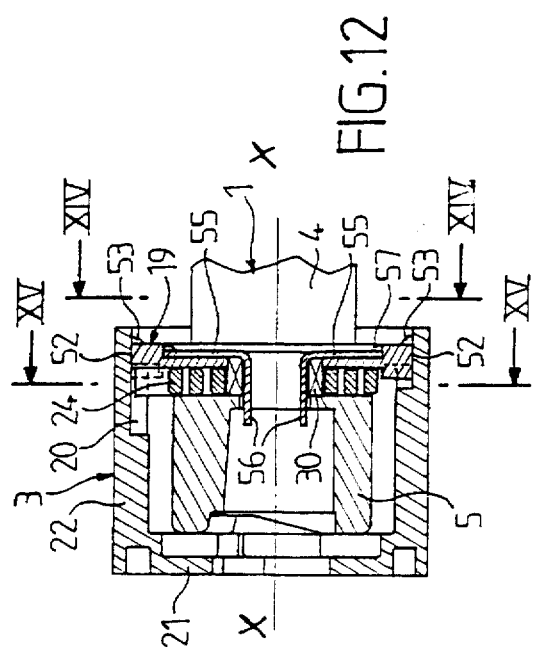
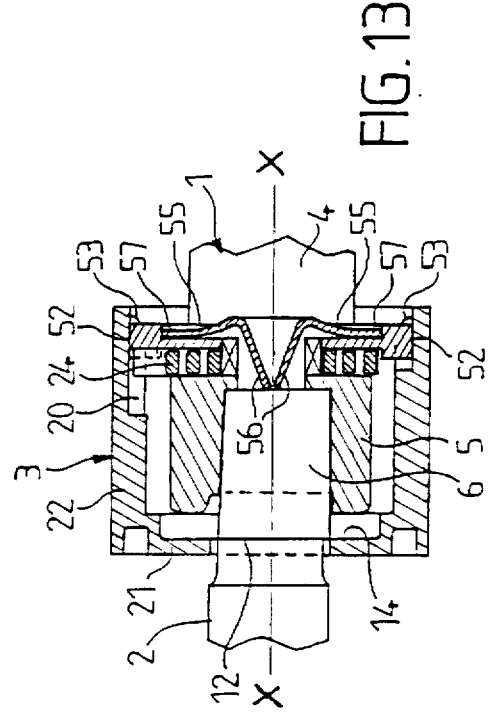
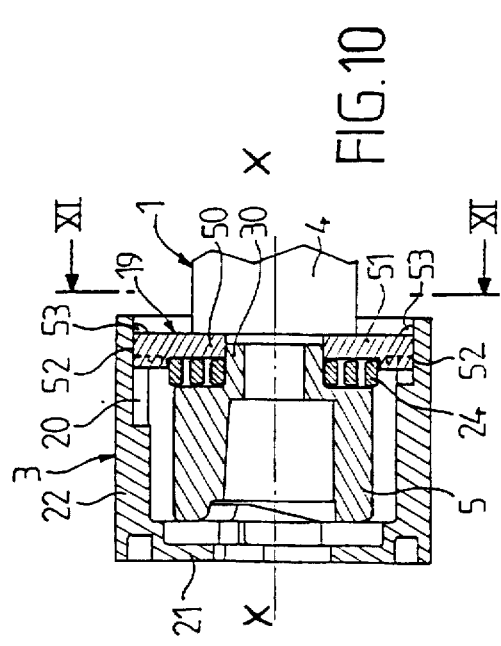
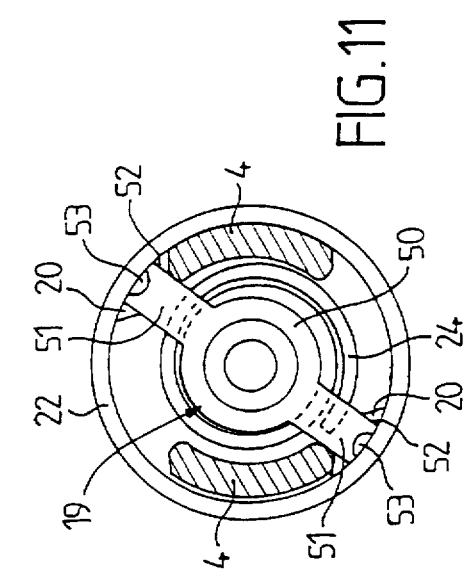

DEVICE FOR COUPLING TWO SHAFTS

BACKGROUND OF THE INVENTION

1. Field of the Invention

The present invention concerns a device for coupling two shafts adapted to turn about a common axis.

The coupling device of the invention is more particularly intended to be fitted to an automobile vehicle steering column.

2. Description of the Prior Art

Devices for coupling two automobile vehicle steering column shafts using systems for taking up clearance requiring the external input of energy by a spring or by the operator are known in themselves. Taking up the clearance of the system requires a very large input of energy, and therefore a spring that is very highly prestressed, which is unfavorable to ease of assembly.

U.S. Pat. No. 5,582,489 assigned to the present assignee discloses a coupling system in which it is proposed to associate two conjugate profiles with a system for holding the shaft coupling in place consisting of a sleeve cooperating with spring means.

OBJECT OF THE INVENTION

The main object of the present invention is to propose another two-shaft coupling device that is easier to fit in the shortest possible time whilst guaranteeing correct taking up of clearance and holding of the shaft coupling in place.

SUMMARY OF THE INVENTION

According to the invention, a coupling device for coupling ends of two shafts adapted to turn about a common axis, comprises rotational coupling means which comprise conjugate profiles respectively at male and female ends of the shafts in a plane substantially perpendicular to the common axis. The conjugate profiles have flanks inclined to this plane, so as to be pressed together and to be held in place by an axial retention system. The axial retention system comprises a sleeve and spring means. The sleeve is axially coupled to one of the shafts and surrounds the end of each of the shafts and the spring means which are disposed inside the sleeve.

The sleeve is in two parts assembled together around the female shaft end having a hollow conjugate profile. The sleeve has first and second bearing end faces substantially perpendicular to the common axis.

The spring means are disposed between the first bearing end face of the sleeve and an external bearing face of the female shaft end which is in a plane substantially perpendicular to the common axis.

The spring means operate through the intermediary of the second bearing end face of the sleeve on an external bearing face of the male shaft end including a raised conjugate profile and substantially perpendicular to the common axis. The spring means operate after interengagement of the conjugate profiles and releasing an arming system for the spring means. The spring means arming system comprises studs which are located on the second bearing end face of the sleeve and which cooperate with cams located on the internal bearing end face of the female shaft end in a plane substantially perpendicular to the common axis.

Advantageously, the spring means comprise a compression spring, or spring washers.

In one advantageous embodiment of the invention, the sleeve includes:

a first part comprising a base having two lateral extensions, and a second part comprising a closure plate, the lateral extensions passing through the closure plate to which they are fastened, the base including the first bearing end face of the sleeve and the closure plate including the second bearing end face of the sleeve.

In another highly beneficial embodiment of the invention the sleeve includes:

a first part comprising a base, and a second part comprising a closure plate provided with two lateral extensions which are enclosed in a handling cover, the base being mounted in the lateral extensions and the handling cover and fastened to them, and the base including the first bearing end face of the sleeve and the closure plate including the second bearing end face of the sleeve.

In order to facilitate operating of the coupling device of the invention, the latter comprises an end-piece for guiding the sleeve and for centering the spring means. The guiding and centering end-piece is an independent member which includes a cylindrical portion leading into a central hole in the base of the sleeve. The cylindrical portion carries and centers the spring means, and is provided with a baseplate between the external bearing face of the female shaft end and the spring means.

In another embodiment, the guide and centering end-piece is a part integral with the female end with which it constitutes a monobloc assembly. The end-piece has a cylindrical part leading into a central hole in the base of the sleeve, the cylindrical part carrying and centering the spring means.

To guarantee that the arming system is held in a locked position, which is the position in which the coupling is shipped, the coupling device includes a compression spring and a retractable arming locking pin located between the female shaft end and the sleeve. In other embodiments, an integral arming locking pin is provided.

To improve and facilitate the mounting of the coupling device of the invention, the latter includes an automatic locking system. In this automatic locking system, the spring means comprise a torsion and compression spring, one end of which cooperates with the guiding and centering end-piece and another end of which cooperates with one of the lateral extensions of the sleeve. The arming system is held in the locked position by a retractable arming locking pin which is located between the female end and the sleeve so that after removal of the pin the torsion and compression spring operates to constitute an automatic locking system.

In another embodiments of the invention, the arming system is held in the locked position by an integral arming locking pin, which is disengaged by introduction of the male shaft end into the female shaft end, which allows the torsion and compression spring to operate to constitute the automatic locking. In accordance with the invention, the integral arming locking pin comprises at least one flexible key disposed in a notch in the base. The flexible key is provided with a pusher member, which cooperates with the end-piece, so that engaging the male shaft end into the female shaft end causes the male shaft end to push back the pusher member and to disengage the key and the pusher member from the end-piece of the female shaft end. In another embodiment, the integral arming locking pin comprises a key provided with a pusher member and mounted in two grooves in the end-piece of the female end. The key is engaged in and pressed into the notch in the base by a compression spring which is located in the end-piece so that after engaging the male shaft end in the female shaft end which causes the male shaft end to push back the pusher member in order to disengage the key from the base.

To facilitate grasping of the device during the locking handling, the closure plate of the sleeve includes a handling cover with which it is integral. This handling cover surrounds the sleeve and a corresponding part of the female shaft end. The handling cover is further provided with two slots through which pass the two teeth of the arming locking pin.

To guarantee correct fitting of the coupling device of the invention, the latter includes a safety system for locking the coupling in the closed position. This safety system comprises a compression spring which is disposed in a recess in the guiding and centering end-piece. This spring presses against a back of the recess so as to push back the inside bearing face of the male shaft end if the latter is not correctly locked in the female shaft end.

In another embodiment of the safety system for locking the coupling in the closed position, the latter comprises a key provided with a pusher member. This key is mounted in two grooves in the end-piece of the female shaft end, and the key is held in a bottom of the grooves by a compression spring disposed in the end-piece so as to push back the internal bearing face of the male shaft end if the latter is not correctly locked in the female shaft end.

In a variant of embodiment particularly interesting of the invention, the handling cover is attached to the base of the sleeve. This handling cover has a back which includes an end-piece for centering the spring means. Moreover, this handling cover surrounds the sleeve and a corresponding part of the female shaft end.

In a prefered form of embodiment of the invention, the arming system comprises three equidistant studs which are located on the second bearing face of the sleeve. These studs cooperate with three cams which are located on the internal bearing end face of the female shaft end. Moreover, each of the cams includes a stop, in order to assure positive locking in rotation. The conjugate profiles at the male end and female end of the two shafts each comprise three equidistant flanks.

For fitting a device according to the invention for coupling two shafts adapted to turn about a common axis, and including rotational coupling means associated with axial retention means, the base with the two lateral extensions of the sleeve is mounted on the female shaft end which is provided with the spring means. The closure plate is then engaged with the two lateral extensions to which it is attached. The spring means arming system is placed in the locked position. The male end of the other shaft is then axially engaged in the female end until corresponding flanks are pressed together and held in place by the axial retention system, after releasing the spring means arming system by rotation of the sleeve, so that the second bearing end face of the sleeve is pressed against the external bearing face of the male shaft end to hold the coupling device in the closed position, the spring means arming system comprising studs on the second bearing face of the sleeve cooperating with cams on the internal bearing face of the female shaft end.

In another variant of the embodiment, the fitting method is characterized in that the female end of the shaft provided with the spring means is mounted in the closure plate provided with the two lateral extensions enclosed in the handling cover. The base is engaged in the handling cover and the lateral extensions to which it is attached.

Moreover, according to the invention, the spring means comprise the torsion and compression spring one end of which cooperates with the end-piece of the female shaft end and the other end of which cooperates with one of the lateral extensions of the sleeve. The spring means arming system is held in the locked position by a retractable arming locking pin which is disposed between the female end and the sleeve, which corresponds to the shipping position. The arming system is in the free position when the retractable locking pin is removed, which causes the torsion and compression spring to turn the sleeve relative to the female end, which corresponds to the closed position of the coupling device, which is maintained by action of the torsion and compression spring.

In a variant of embodiment, for fitting the coupling device according to the invention, the spring means arming system is held in the locked position by an integral arming locking pin. This integral pin is in the base of the sleeve and is engaged in the end-piece of the female shaft end, which corresponds to the shipping position. The arming system is in the free position when the male shaft end is engaged in the female shaft end, which pushes back and disengages the integral arming locking pin.

The coupling device of the invention therefore has the advantage of enabling rapid and effortless fitting, easily and without any clearance when new or when worn and, moreover, when the coupling has been effected, it is guaranteed mechanically. Finally, the parts employed are relatively simple, and therefore of low cost, as well as relatively compact.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 1 is a general view in axial section of the coupling device of the invention, the coupling device assembly being in a shipping position;

FIG. 2 is a view taken along the line II—II in FIG. 1;

FIG. 3 is an axial section taken along a plane perpendicular to that of FIG. 1, the coupling device assembly being in a closed position;

FIG. 4 is a section taken along the line IV—IV in FIG. 3;

FIG. 5 is an exploded perspective view of the coupling device assembly before fitting;

FIG. 6 is a general view in axial section of another embodiment of the invention, the coupling device assembly being in a shipping position;

FIG. 7 is a section taken along the line VII—VII in FIG. 6;

FIG. 8 is an axial section taken along a plane perpendicular to that of FIG. 6, the coupling device assembly being in a closed position;

FIG. 9 is an axial section similar to FIG. 3 of another embodiment of the invention, the coupling device assembly being in a closed position;

FIG. 10 is a general view in axial section of another embodiment of the invention, the coupling device assembly being in a shipping position;

FIG. 11 is a section taken along the line XI—XI in FIG. 10;

FIG. 12 is a general view in axial section of another embodiment of the invention, the coupling device assembly being in a shipping position;

FIG. 13 is an axial section similar to FIG. 12, the coupling device assembly being in a closed position;

DESCRIPTION OF THE PREFERRED EMBODIMENTS

Figure 16:
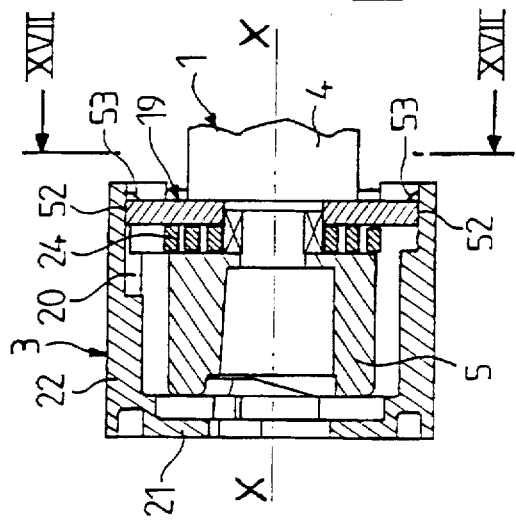
FIG. 16 is a general view in axial section of another embodiment of the invention, the coupling device assembly being in a shipping position.

The coupling device of the invention is designed to couple the ends of two shafts denoted 1 and 2 which are adapted to turn about a common axis X—X. The embodiment shown in the figures relates to a coupling device more particularly intended for an automobile steering column, the shaft 1 being the driving shaft and part of the steering column through a universal joint jaw, the shaft 2 being the driven shaft and part of the pinion rod of the steering box.

As can be seen in the various figures, the coupling device for coupling the ends of the two shafts 1 and 2 includes means for coupling the two shafts 1 and 2 in rotation which are associated with an axial retention system. The rotational coupling means comprise conjugate profiles on each of the shafts 1 and 2. The shaft 1 has a female end 5 which is provided with two branches 4. This female shaft end 5 has the hollow conjugate profile. The shaft 2 has a male end 6 which has the raised conjugate profile. These conjugate profiles are in a plane substantially perpendicular to the common axis X—X, with flanks inclined to this plane. The female shaft end 5 has flanks 7, and the male shaft end 6 has flanks 8. In the embodiments of the invention shown in the figures, the conjugate profiles have three equidistant flanks 7 and 8. After insertion of the male shaft end 6 into the female shaft end 5, the flanks 7 and 8 are pressed against each other to provide the rotational coupling and are held in place by the axial retention system.

The female shaft end 5 has an internal bearing face 9 and an external bearing face 11, and the male shaft end 6 has an internal bearing face 10 and an external bearing face 12. All these bearing faces are in planes substantially perpendicular to the axis X—X.

The axial retention system comprises a sleeve 3 and spring means which can be spring washers 23 as shown in FIGS. 1, 2, 3, 4, 5 and 9 or a torsion and compression spring 24 as shown in FIGS. 6, 7 and 8.

The embodiment shown in FIGS. 1 through 9 includes a sleeve 3 which has a base 19 with two lateral extensions 20 and a closure plate 21. The two lateral extensions 20 pass through slots 25 in the closure plate 21.

At assembly time, the base 19 is engaged in the female end 5, which is provided with spring washers 23 against the external bearing face 11. For this, the lateral extensions 20 pass between the two branches 4 and surround the end 5, to penetrate the slots 25 in the closure plate 21, which faces the internal bearing face 9 of the female end 5. The ends of the lateral extensions 20 are then crimped to the closure plate 21.

The closure plate 21 also has a central opening 27 the contour of which corresponds to the contour of the male end 6.

The sleeve 3 is therefore in two parts, one comprising the base 19 and the lateral extensions 20 and the other comprising the closure plate 21. Moreover, the sleeve has two bearing faces at each end, substantially perpendicular to the common axis X—X. A bearing face 13 is part of the base 19 on the same side as the spring washers 23 and a bearing face 14 is part of the closure plate 21 on the same side as the inside face 9 of the female end 5.

The sleeve 3 is coupled axially to the shaft 1 by the lateral extensions 20, which are guided between the branches 4 of the female end 5. In this way the sleeve 3 is assembled around the female end 5 of the shaft 1 and also surrounds the male end 6 when the coupling is made. In this way the spring washers 23 are disposed inside the sleeve 3, between the bearing face 13 of the sleeve and the external bearing face 11 of the female end 5. The spring means 23 operate through the other bearing face 14 of the sleeve 3 on the external bearing face 12 of the male end 6 after the conjugate profiles have been interengaged with each other and a system for arming the spring means has been released.

The arming system comprises three equidistant studs 17 which are located on the bearing face 14 of the sleeve 3. The three studs 17 cooperate with three cams 18 on the internal bearing face 9 of the female end 5.

To facilitate grasping of the coupling, the sleeve 3 includes a handling cover 22 which is integral with the closure plate 21 and which is disposed at its periphery in order to surround the sleeve 3 and the corresponding part of the female end 5. Only part of the handling cover 22 is shown in FIG. 5, in order to show the interior of the closure plate 21.

To improve the operation of the coupling, the device includes an end-piece 30 for guiding the sleeve 3 and for centering the spring washers 23. The end-piece 30 is a part independent of the female end 5 and includes a cylindrical portion 31 extended by a baseplate 32. The cylindrical portion 31 carries and centers the spring washers 23 and leads into a central hole 26 in the base 19. The baseplate 32 is disposed between the outside bearing face 11 of the female end 5 and the spring washers 23.

In the embodiment shown in FIGS. 6, 7 and 8 the end-piece 30 guiding the sleeve 3 and centering the spring means is a part integral with the female end 5, with which it constitutes a monobloc assembly. The end-piece 30 has a cylindrical portion 31 leading into a central hole 26 in the base 19 of the sleeve 3.

In this embodiment of the invention, the device further includes an automatic locking system to facilitate fitting, shown in FIG. 7. In this system, the spring means comprise a torsion and compression spring 24 which has one end 36 which is engaged in the end-piece 30 of the female end 5 and the other end 37 which is pressed against one of the lateral extensions 20 of the sleeve 3. The arming system is held in the locked position by an arming locking pin 40 disposed between the female end 5 and the sleeve 3, i.e. between one of the lateral extensions 20 of the sleeve 3 and one of the branches 4 of the end 5. To allow this, the handling cover 22 has two slots 42 through which pass the two teeth 41 of the arming locking pin 40 which are mounted on the branch 4. After removing the pin 40, the torsion and compression spring 24 operates to constitute an automatic locking system which places the arming system in the free position and which holds the coupling device in the closed position.

In order to assure that the coupling device is made effectively, the invention includes a safety system for locking the coupling between the ends of the shafts. This system is shown in FIGS. 1, 3, 6 and 8 and comprises a compression spring 34 which is disposed in a recess 33 in the guiding and centering end-piece 30. The spring 34 presses against the back 35 of the recess 33 so as to push back the inside bearing face 10 of the male end 6 if the latter is not locked correctly into the female end 5.

Other embodiments of the invention will now be described in which components having the same function as components already described are identified by the same reference numbers.

The embodiments of the invention shown in FIGS. 10 through 17 include a sleeve 3 which has a base 19 and a closure plate 21 with two lateral extensions 20 enclosed in a handling cover 22. The base 19 has a central part 50 and two arms 51 which engage in the corresponding notch 52 in the lateral extension 20 and the handling cover 22.

At assembly time, the female end 5 of the shaft 1 fitted with the spring means 23 or 24 is mounted in the closure plate 21 with two lateral extensions 20 enclosed in the handling cover 22. To allow this, the lateral extensions 20 pass between the two branches 4 and surround the end 5. The two arms 51 of the base 19 are each engaged in the corresponding notch 52 in the handling cover 22 and in the lateral extensions 20. The ends of the arms 51 are then fastened to the lateral extensions 20 and the handling cover 22 by crimps 53.

Thus the sleeve 3 is in two parts, one comprising the base 19 and the other the closure plate 21 provided with two lateral extensions 20 enclosed in the handling cover 22. Moreover, the sleeve has the two bearing faces at each end: the bearing face 13 is part of the base 19 and the bearing face 14 is part of the closure plate 21.

In the embodiment shown in FIGS. 10 and 11 the spring means comprise a compression spring 24. In this type of embodiment, as in that shown in FIGS. 1 through 5, the coupling is made entirely manually, beginning with an axial engagement movement followed by a rotation movement of the sleeve 3.

In these embodiments, the arming system can be held in the locked position by a retractable arming locking pin 40 disposed between the female end 5 and the sleeve 3. The retractable pin 40 is mounted in the same manner as that shown in FIG. 7, and passes through two slots 42 in the handling cover 22.

Figure 17:
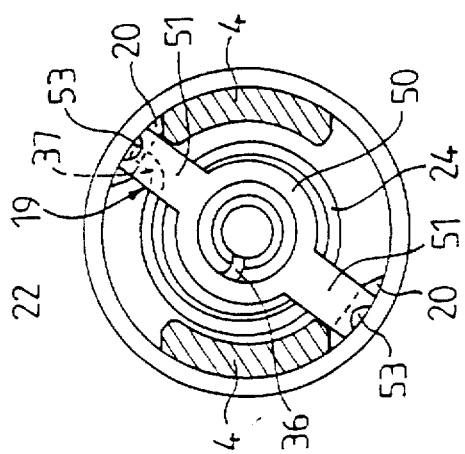
FIG. 17 is a section taken along the line XVII—XVII in FIG. 16.
Figure 14:
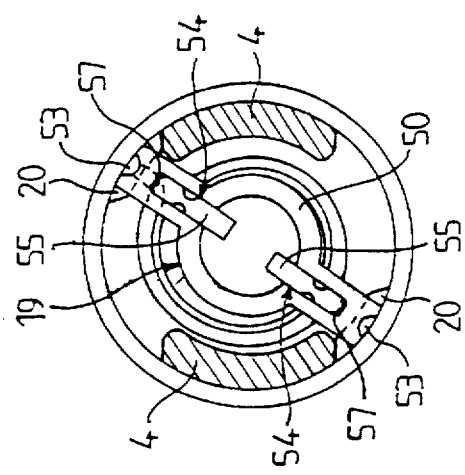
FIG. 14 is a section taken along the line XIV—XIV in FIG. 12.
Figure 15:
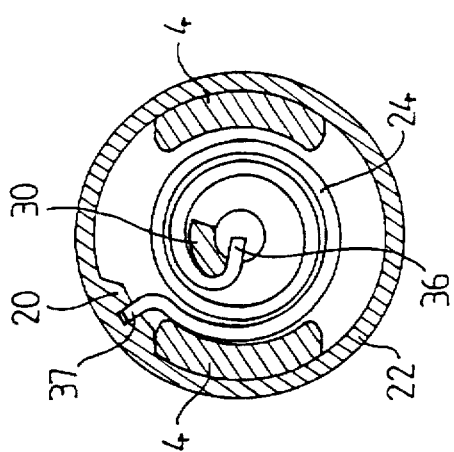
FIG. 15 is a section taken along the line XV—XV in FIG. 12.
Figure 20:
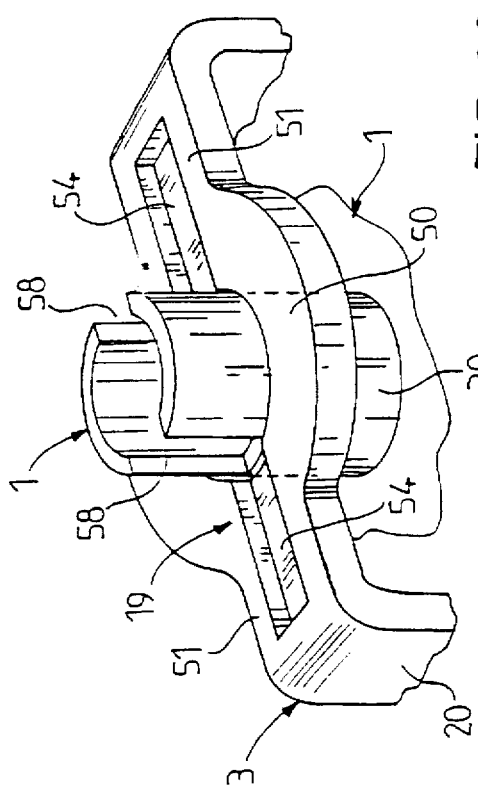
FIG. 20 is an exploded perspective view of FIG. 18.
Figure 21:
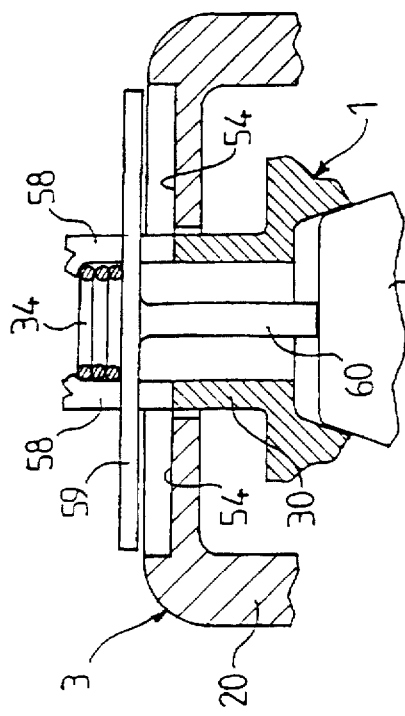
FIG. 21 is a view similar to FIG. 18, the coupling device assembly being in a closed position.
Figure 18:
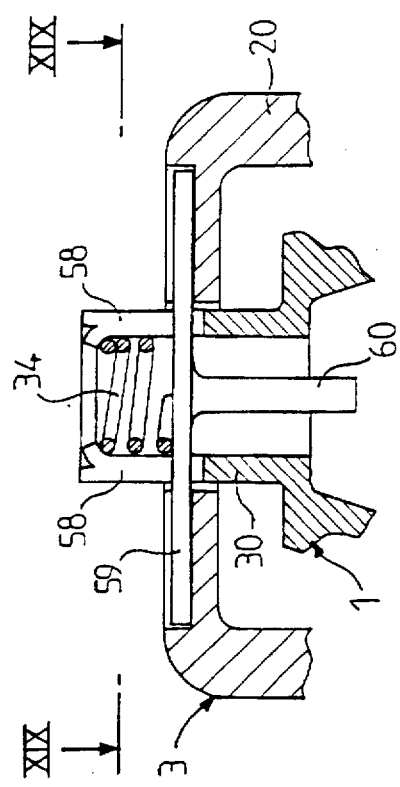
FIG. 18 is a fragmentary view in axial section of a variant of the invention, the coupling device assembly being in a shipping position.
Figure 19:
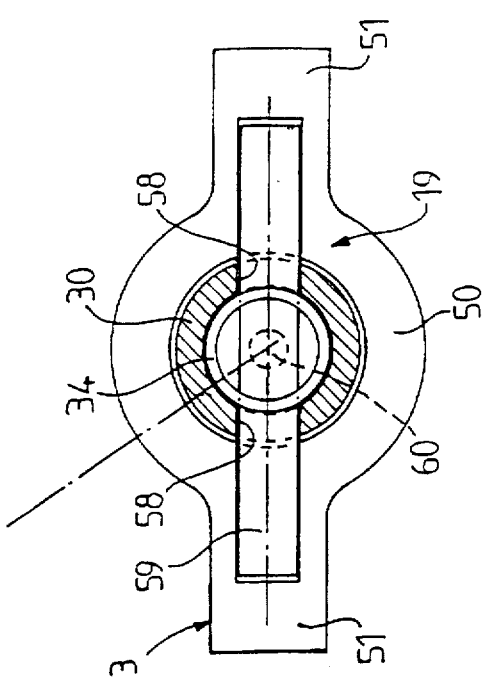
FIG. 19 is a section taken along the line XIX—XIX in FIG. 18.

The embodiment shown in FIGS. 16 and 17 is similar to that shown in FIGS. 6, 7 and 8, but with a different implementation of the sleeve 3. In FIGS. 16 and 17, the spring means comprise a torsion and compression spring 24 which has one end 36 which is pressed against the end-piece 30 of the female end 5 and the other end 37 engaged in one of the lateral extensions 20. The arming system is held in the locked position by the retractable arming locking pin 40 which is disposed between the female end 5 and the sleeve 3. To allow this, the handling cover 22 has two slots 42 through which pass the two teeth 41 of the retractable arming locking pin 40. After the pin 40 is removed the torsion and compression spring 24 operates to constitute an automatic locking system which places the arming system in the free position and which holds the coupling device in the closed position.

In the embodiment of the invention shown in FIGS. 12 through 15 the spring means comprise a torsion and compression spring 24. The spring 24 has one end 36 pressed against the end-piece 30 and the other end 37 engaged in one of the lateral extensions 20 of the sleeve 3. The arming system is held in the locked position by an integral arming locking pin made up of two flexible keys 55. Each of the flexible keys 55 is provided with a pusher member 56 and is housed in a notch 54 made in the corresponding arm 51 of the base 19. The end of each of the flexible keys 55 is attached to the base 19 by a crimp 57. Each of the pusher members 56 cooperates with the end-piece 30 of the female end 5 so that after engaging the male shaft end 6 in the female shaft end 5, which causes the male end 6 to push back the pusher member 56 in order to disengage the key 55 and the pusher member 56 from the end-piece 30 of the female end 5, the torsion and compression spring 24 operates to constitute an automatic locking system.

FIGS. 18 through 21 show another embodiment of the integral arming locking pin. In this case, the integral arming locking pin comprises a key 59 provided with a pusher member 60. The key 59 is adapted to penetrate the two notches 54 in the base 19. This key 59 is mounted in two grooves 58 in the end-piece 30 of the female end 5. The key 59 is engaged in and pressed into the notches 54 in the base 19 by a compression spring 34 disposed in the end-piece 30 and pressed against the back of the end-piece 30 which consists of a deformation of the end of said end-piece. Engaging the male end 6 in the female end 5 causes the male end 6 to push back the pusher member 60 in order to disengage the key 59 from the base 19, whereupon the torsion and compression spring 24 can operate to constitute an automatic locking system.

In the embodiments shown in FIGS. 12 through 15 and 18 through 21 the spring means can comprise a simple compression spring 24. In this case, the arming system is held in the locked position by the integral arming locking pin and locking is effected manually.

Figure 22:
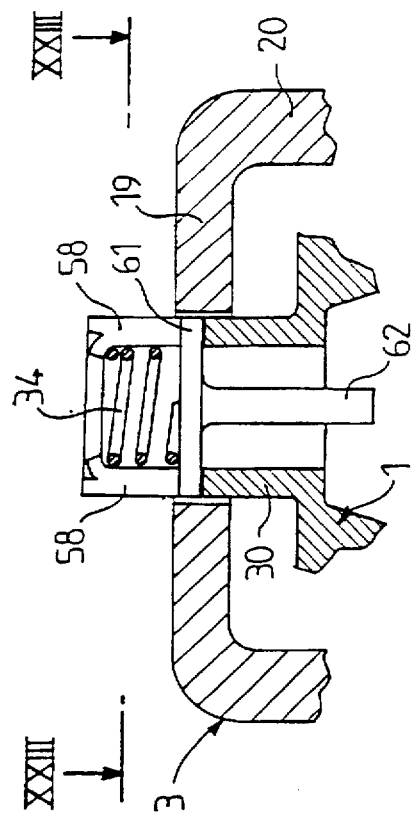
FIG. 22 is a fragmentary view in axial section of a variant of the invention, the coupling device assembly being in a shipping position.
Figure 23:
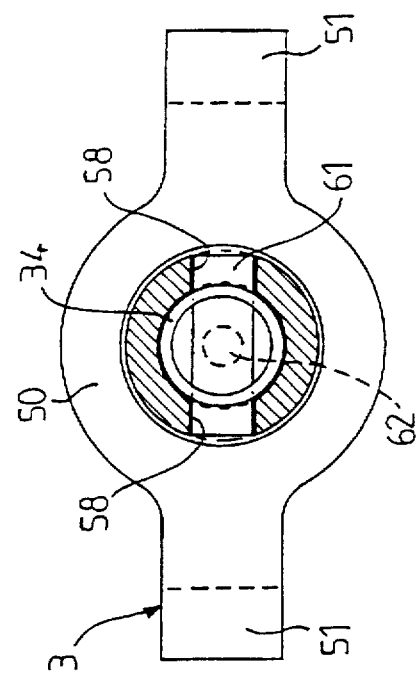
FIG. 23 is a section taken along the line XXIII—XXIII in FIG. 22.

FIGS. 22 and 23 show another embodiment of the safety system for locking the coupling in the closed position. In this embodiment the safety system comprises a key 61 which is provided with a pusher member 62. The key 61 is mounted in two grooves 58 in the end-piece 30 of the female end 5. This key 61 is held in the bottom of said grooves 58 by a compression spring 34 which is disposed in the end-piece 30 and which is pressed against a rim at the end of the end-piece 30. The action of the spring 34 on the key 61 and therefore on the pusher member 62 pushes back the internal bearing face 10 of the male end 6 if the latter is not locked correctly in the female end 5.

Figure 24:
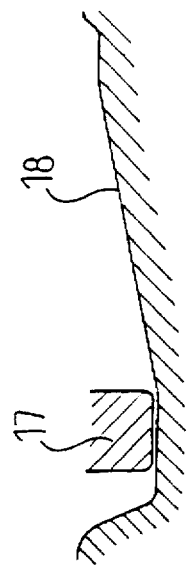
FIG. 24 shows the profile of the cam of the invention.
Figure 25:
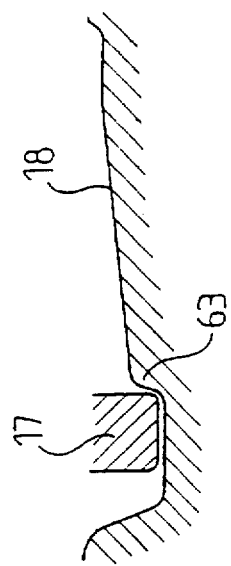
FIG. 25 shows another cam profile in accordance with the invention.

In all the embodiments previously described, it is possible to unlock the coupling device by manually rotating the sleeve 3. To prevent the sleeve 3 rotating relative to the jaw 5, after the device is locked, and as shown in FIG. 25, a stop 63 is provided on the cams 18 made on the end 5 shown in FIG. 24.

The method of fitting the device for coupling the two shafts 1 and 2 adapted to turn about a common axis X—X includes rotational coupling means associated with axial retention means as shown in FIG. 5 in particular. In this fitting method, the base 19 with the two lateral extensions 20 of the sleeve 3 is fitted to the female end 5 of the shaft 1, which is provided with spring means in the form of the spring washers 23 or the spring 24. The closure plate 21 is then fitted to the two lateral extensions 20, to which it is attached. The spring means arming system is then placed in the locked position. The male end 6 of the other shaft 2 is engaged axially in the female end 5 until the corresponding flanks 7 and 8 are pressed together, and are held in place by the axial retention system, after releasing the spring means arming system by rotating the sleeve 3, so that the bearing face 14 of the sleeve 3 is pressed against the external bearing face 12 of the male end 6, to hold the coupling device in the closed position. In this method, the spring means arming system comprises studs 17 on the bearing face 14 of the sleeve 3 and cooperating with cams 18 on the internal bearing face 9 of the female end 5.

The method of fitting the coupling device shown in FIGS. 10 through 17 is characterized in that the female end 5 of the shaft 1 provided with the spring means 23 or 24 is mounted in the closure plate 21 provided with the two lateral extensions 21 enclosed in the handling cover 22. The base 19 is engaged in the handling cover 22 and the lateral extensions 21 to which it is fastened. The spring means arming system is then placed in the locked position. The coupling is then effected as in the method previously described.

In the fitting method of the invention, the spring means comprise the torsion and compression spring 24, one end 36 of which is pressed against the end-piece 30 of the end 5 and the other end 37 of which is inserted in one of the lateral extensions 20 of the sleeve 3. The arming system for the spring means 24 is held in the locked position by an integral arming locking pin. This integral arming locking pin is provided in the base 19 of the sleeve 3 and is engaged in the end-piece 30 of the female end 5, which corresponds to the shipping position. The arming system is in the free position when the male end 6 is engaged in the female end 5, which pushes back and disengages the integral arming locking pin, which enables the torsion and compression spring 24 to turn the sleeve 3 relative to the female end 5, to achieve the closed position of the coupling device, which is maintained by the action of the torsion and compression spring 24.

In the fitting method of the invention, the spring means comprise the torsion and compression spring 24 one end 36 of which is engaged in the end-piece 30 of the female end 5 and the other end 37 of which is pressed against one of the lateral extensions 20 of the sleeve 3. The arming system for the spring means 24 is held in the locked position by a retractable arming locking pin 40 between the female end 5 and the sleeve 3, which corresponds to the shipping position, the arming system is in the free position when the locking pin 40 is removed, which causes the torsion and compression spring 24 to turn the sleeve 3 relative to the female end 5, which corresponds to the closed position of the coupling device, which is maintained by the action of the torsion and compression spring 24.

What we claim is:

1. A coupling device for coupling ends of two shafts adapted to turn about a common axis, comprising:

rotational coupling means comprising conjugate raised and hollow profiles respectively at male and female ends of said shafts in a plane substantially perpendicular to said common axis, with flanks inclined relative to said plane, an axial retention system comprising a sleeve and spring means for pressing together and holding in place said male and female shaft ends, and an arming system for said spring means;

said sleeve being axially coupled to one of said shafts and surrounding said male and female shaft ends and said sleeve having two parts which are assembled together around said female shaft end having said hollow conjugate profile, and which provide first and second bearing end faces substantially perpendicular to said common axis, said spring means being disposed inside said sleeve between said first bearing end face of said sleeve and an external bearing face of said female shaft end substantially perpendicular to said common axis, said spring means operating through the intermediary of said second bearing end face of said sleeve on an external bearing face of said male shaft end having said raised conjugate profile and substantially perpendicular to said common axis, after interengagement of said conjugate profiles and releasing said spring means arming system, and said spring means arming system comprising studs located on said second bearing end face of said sleeve, and cams located on an internal bearing face of said female shaft end in a plane substantially perpendicular to said common axis and cooperating with said studs.

2. The coupling device claimed in claim 1 wherein said spring means comprise a compression spring.

3. The coupling device claimed in claim 1 wherein said spring means comprise spring washers.

4. The coupling device claimed in claim 1 wherein said sleeve includes:

a first part comprising a base having two lateral extensions, and a second part comprising a closure plate, said lateral extensions passing through said closure plate to which they are fastened, said base including said first bearing end face of said sleeve and said closure plate including said second bearing end face of said sleeve.

5. The coupling device claimed in claim 1 wherein said sleeve includes:

a first part comprising a base, and a second part comprising a closure plate provided with two lateral extensions which are enclosed in a handling cover, said base being mounted in said lateral extensions and said handling cover and fastened to them, and said base including said first bearing end face of said sleeve and said closure plate including said second bearing end face of said sleeve.

6. A coupling device as claimed in claim 1 comprising an end-piece for guiding said sleeve and for centering said spring means, and wherein said sleeve includes a first part comprising a base and a second part comprising a closure plate, one of said base and closure plate being provided with two lateral extensions, said base including said first bearing end face of said sleeve and said closure plate including said second bearing end face of said sleeve.

7. The coupling device claimed in claim 6 wherein said guiding and centering end-piece is an independent member which includes a cylindrical portion leading into a central hole in said base of said sleeve, said cylindrical portion carrying and centering said spring means and being provided with a baseplate between said external bearing face of said female shaft end and said spring means.

8. The coupling device claimed in claim 6 wherein said guiding and centering end-piece is a part integral with said female shaft end with which it constitutes a monobloc assembly and said end-piece has a cylindrical part leading into a central hole in said base of said sleeve, said cylindrical part carrying and centering said spring means.

9. The coupling device claimed in claim 8 wherein said spring means comprise a compression spring, said spring means arming system being held in a locked position by a retractable arming locking pin located between said female shaft end and said sleeve.

10. The coupling device claimed in claim 8 wherein said spring means comprise a compression spring, said spring means arming system being held in a locked position by an integral arming locking pin comprising at least one flexible key in a notch in said base, said flexible key being provided with a pusher member that cooperates with said end-piece so that engaging said male shaft end in said female shaft end causes said male shaft end to push back said pusher member and to disengage said key and said pusher member from said end-piece of said female shaft end.

11. The coupling device claimed in claim 8 wherein said spring means comprise a compression spring, said spring means arming system being held in a locked position by an integral arming locking pin comprising a key provided with a pusher member and mounted in two grooves of said end-piece of said female shaft end, said key being engaged in and pressed into a notch of said base by a compression spring in said end-piece so that engaging said male shaft end in said female shaft end causes said male shaft end to push back said pusher member and disengage said key from said base.

12. The coupling device claimed in claim 8 wherein said spring means comprise a torsion and compression spring having an end cooperating with said end-piece and another end cooperating with one of said lateral extensions of said sleeve, said spring means arming system being held in a locked position by a retractable arming locking pin located between said female shaft end and said sleeve so that after removal of said pin said torsion and compression spring operates to constitute an automatic locking system.

13. The coupling device claimed in claim 8 wherein said spring means comprise a torsion and compression spring having an end cooperating with said end-piece and another end cooperating with one of said lateral extensions of said sleeve, said spring means arming system being held in a locked position by an integral arming locking pin comprising at least one flexible key provided with a pusher member in a notch of said base, said flexible key being provided with a pusher member that cooperates with said end-piece so that after engaging said male shaft end in said female shaft end, which causes said male shaft end to push back said pusher member in order to disengage said key and said pusher member from said end-piece of said female shaft end, said torsion and compression spring operates to constitute an automatic locking system.

14. The coupling device claimed in claim 8 wherein said spring means comprise a torsion and compression spring having an end cooperating with said end-piece and another end cooperating with one of said lateral extensions of said sleeve, said spring means arming system being held in the locked position by an integral arming locking pin comprising a key which is provided with a pusher member, located in a notch of said base and mounted in two grooves in said end-piece of said female shaft end, said key being engaged in and pressed into said notch of said base by a compression spring located in said end-piece so that after engaging said male shaft end in said female shaft end which causes said male shaft end to push back said pusher member in order to disengage said key from said base, said torsion and compression spring operates to constitute an automatic locking system.

15. A coupling device as claimed in claim 4 including a handling cover integral with said closure plate of said sleeve, said handling cover surrounding said sleeve and a corresponding part of said female shaft end.

16. The coupling device claimed in claim 5 wherein said handling cover is integral with said closure plate of said sleeve, said handling cover surrounding said sleeve and a corresponding part of said female shaft end and being provided with two slots through which pass said two teeth respectively of an arming locking pin.

17. A coupling device as claimed in claim 6 including a safety system for locking said coupling between said shaft ends in a closed position, said safety system comprising a compression spring disposed in a recess made in said guiding and centering end-piece, said spring pressing against a back of said recess so as to push back said inside bearing face of said male shaft end if the latter is not correctly locked in said female shaft end.

18. A coupling device as claimed in claim 8 including a safety system for locking said coupling between said shaft ends in a closed position, said safety system comprising a key provided with a pusher member and mounted in two grooves in said end-piece of said female shaft end, said key being held in a bottom of said grooves by a compression spring disposed in said end-piece so as to push back said internal bearing face of said male shaft end if the latter is not correctly locked in said female shaft end.

19. A coupling device as claimed in claim 4 including a handling cover provided with a back which is attached to said base of said sleeve and which has an end-piece for centering said spring means, said handling cover surrounding said sleeve and a corresponding part of said female shaft end.

20. The coupling device claimed in claim 1 wherein said spring means arming system comprises three equidistant studs which are located on said second bearing face of said sleeve and which cooperate with three cams located on said internal bearing face of said female shaft end.

21. The coupling device claimed in claim 20 wherein said cams each include a stop.

22. The coupling device claimed in claim 1 wherein said conjugate profiles each comprise three equidistant flanks.

23. A coupling device as claimed in claim 1 included in an automobile vehicle steering column.

* * * * *